(12) United States Patent
Yonezawa et al.

(10) Patent No.: US 8,744,640 B2
(45) Date of Patent: Jun. 3, 2014

(54) GREEN POWER DEMAND MANAGEMENT DEVICE

(75) Inventors: Minoru Yonezawa, Tokyo (JP);
Yoshiyuki Hondo, Kawasaki (JP);
Toshimitsu Kumazawa, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 439 days.

(21) Appl. No.: 13/233,248

(22) Filed: Sep. 15, 2011

(65) Prior Publication Data

US 2012/0074789 A1 Mar. 29, 2012

(30) Foreign Application Priority Data

Sep. 28, 2010 (JP) .................................. 2010-217856

(51) Int. Cl.
*H02J 4/00* (2006.01)
(52) U.S. Cl.
USPC .......................................... 700/295; 702/62
(58) Field of Classification Search
USPC .......... 700/22, 286, 291, 295; 702/60, 61, 62; 705/400, 412; 307/84
See application file for complete search history.

(56) References Cited

U.S. PATENT DOCUMENTS

| | | | | |
|---|---|---|---|---|
| 7,818,270 B2 * | 10/2010 | Carey et al. | .................... | 705/412 |
| 8,197,752 B2 * | 6/2012 | Nojima et al. | ................. | 705/412 |
| 8,463,561 B2 * | 6/2013 | Gamboa Tuesta et al. | ..... | 702/61 |
| 2005/0142405 A1 * | 6/2005 | Nagamitsu et al. | ............. | 429/22 |
| 2006/0161450 A1 * | 7/2006 | Carey et al. | ........................ | 705/1 |
| 2009/0281677 A1 * | 11/2009 | Botich et al. | ................... | 700/295 |
| 2010/0145629 A1 * | 6/2010 | Botich et al. | .................... | 702/62 |

FOREIGN PATENT DOCUMENTS

| | | |
|---|---|---|
| JP | 2009-70083 | 4/2009 |
| JP | 2010-028879 | 2/2010 |

OTHER PUBLICATIONS

Japanese Office Action issued Mar. 16, 2012 in Patent Application No. 2010-217856 with English Translation.
U.S. Appl. No. 13/233,353, filed Sep. 15, 2011, Kumazawa, et al.

* cited by examiner

*Primary Examiner* — Charles Kasenge
(74) *Attorney, Agent, or Firm* — Oblon, Spivak, McClelland, Maier & Neustadt, L.L.P.

(57) ABSTRACT

A green power demand management device includes: a power meter which receives power from a power distribution system with a plurality of power generating units, and supplies a received power to a first appliance; a receiver which receives energy mixture information showing a power generation proportion among each power generating unit, a measuring unit which measures electric energy consumed by the first appliance, a setting unit which sets a first threshold, and an operating state control manager which uses an intensity conversion table including emission intensities each representing an amount of an environmental load material emitted by each power generating unit, obtains a second threshold by dividing the first threshold by sum total of the emission intensity of each power generating unit weighted by the proportion, and controls the first appliance so that electric energy consumption of the first appliance is equal to or smaller than the second threshold.

6 Claims, 17 Drawing Sheets

| | EMISSION INTENSITY (kgCO$_2$/kWh) |
|---|---|
| NUCLEAR POWER | 0 |
| HYDRAULIC POWER | 0 |
| SUNLIGHT | 0 |
| COAL | 0.858 |
| OIL (DAYTIME) | 0.657 (DAYTIME) |
| OIL (NIGHTTIME) | 0.867 (NIGHTTIME:23:00-10:00) |

EXAMPLE OF INTENSITY CONVERSION TABLE BASED ON EACH POWER GENERATION METHOD

FIG. 2

| MODE CHAGE PATTERNS | CONCRETE SETTINGS |
|---|---|
| CHANGE PATTERN+α | TRAGET TEMPERATURE SETTING IS CHANGED BY 3° C(-3° C WHEN HEATING, +3° C WHEN COOLING) |
| CHANGE PATTERN+β | TARGET TEMPERATURE SETTING IS CHANGED BY 2° C(-2° C WHEN HEATING, +2° C WHEN COOLING) |
| CHANGE PATTERN+γ | TARGET TEMPERATURE SETTING IS CHANGED BY 1° C(-1° C WHEN HEATING, +1° C WHEN COOLING) |
| CHANGE PATTERN+δ | AIR VOLUME IS REDUCED BY 1 LEVEL |
| CHANGE PATTERN−δ | AIR VOLUME IS INCREASED BY 1 LEVEL |
| CHANGE PATTERN−γ | TARGET TEMPERATURE SETTING IS CHANGED BY 1° C(+1° C WHEN HEATING, -1° C WHEN COOLING) |
| CHANGE PATTERN−β | TARGET TEMPERATURE SETTING IS CHANGED BY 2° C(+2° C WHEN HEATING, -2° C WHEN COOLING) |
| CHANGE PATTERN−α | TARGET TEMPERATURE SETTING IS CHANGED BY 3° C(+3° C WHEN HEATING, -3° C WHEN COOLING) |

FIG. 3

CHANGE IN POWER CONSUMPTION (REDUCED) PER 1 HOUR IN COOLING OPERATION

|  | 15°C LESS OR EQUAL | ROOM TEMPERATURE | | |
|---|---|---|---|---|
|  |  | 16°C | 17°C | 18°C |
| CHANGE PATTERN+α | 3.0kwh | 2.0kwh | 1.4kwh | 1.2kWh |
| CHANGE PATTERN+β | 2.0kwh | 1.4kwh | 1.2kwh | 1.0kWh |
| CHANGE PATTERN+γ | 1.4kwh | 1.2kwh | 1.0kwh | 0.8kWh |
| CHANGE PATTERN+δ | 1.2kwh | 1.0kwh | 0.8kwh | 0.2kWh |
| CHANGE PATTERN−δ | −0.5kwh | 0.0kwh | 0.0kwh | 0.0kWh |
| CHANGE PATTERN−γ | −0.8kwh | −0.2kwh | 0.0kwh | −0.5kWh |
| CHANGE PATTERN−β | −1.2kwh | −0.5kwh | −0.5kwh | −1.0kWh |
| CHANGE PATTERN−α | −1.5kwh | −0.8kwh | −1.0kwh | −1.2kWh |

FIG. 4

IN COOLING OPERATION

| | ROOM TEMPERATURE | | | | | | | | |
|---|---|---|---|---|---|---|---|---|---|
| | 15°C LESS OR EQUAL | 16°C | 17°C | 18°C | ••• | 32°C | 33°C | 34°C | 35°C GREATER OR EQUAL |
| CHANGE PATTERN+α | 0% | 0% | 10% | 10% | | 90% | 95% | 100% | 100% |
| CHANGE PATTERN+β | 0% | 0% | 10% | 10% | | 90% | 95% | 100% | 100% |
| CHANGE PATTERN+γ | 0% | 0% | 10% | 10% | | 90% | 95% | 100% | 100% |
| CHANGE PATTERN+δ | 0% | 0% | 10% | 10% | | 80% | 95% | 100% | 100% |
| CHANGE PATTERN−δ | 0% | 0% | 0% | 10% | | 80% | 90% | 95% | 95% |
| CHANGE PATTERN−γ | 0% | 0% | 0% | 10% | | 50% | 70% | 80% | 80% |
| CHANGE PATTERN−β | 0% | 0% | 0% | 0% | | 30% | 50% | 70% | 70% |
| CHANGE PATTERN−α | 0% | 0% | 0% | 0% | | 10% | 20% | 30% | 40% |

(A)

IN HEATING OPERATION

| | ROOM TEMPERATURE | | | | | | | | |
|---|---|---|---|---|---|---|---|---|---|
| | 35°C GREATER OR EQUAL | 34°C | 33°C | 32°C | ••• | 18°C | 17°C | 16°C | 15°C LESS OR EQUAL |
| CHANGE PATTERN+α | 0% | 0% | 10% | 10% | | 90% | 95% | 100% | 100% |
| CHANGE PATTERN+β | 0% | 0% | 10% | 10% | | 90% | 95% | 100% | 100% |
| CHANGE PATTERN+γ | 0% | 0% | 10% | 10% | | 90% | 95% | 100% | 100% |
| CHANGE PATTERN+δ | 0% | 0% | 10% | 10% | | 80% | 95% | 100% | 100% |
| CHANGE PATTERN−δ | 0% | 0% | 0% | 10% | | 80% | 90% | 95% | 95% |
| CHANGE PATTERN−γ | 0% | 0% | 0% | 10% | | 50% | 70% | 80% | 80% |
| CHANGE PATTERN−β | 0% | 0% | 0% | 0% | | 30% | 50% | 70% | 70% |
| CHANGE PATTERN−α | 0% | 0% | 0% | 0% | | 10% | 20% | 30% | 40% |

THE CASE OF LIGHTING APPLIANCE

| MODE CHANGE PATTERNS | CONCRETE SETTINGS |
|---|---|
| CHANGE PATTERN+α | ILLUMINANCE IS REDUCED BY 2 LEVELS, AND LIGHTING AREA IS SET TO 50% |
| CHANGE PATTERN+β | ILLUMINANCE IS REDUCED BY 1 LEVEL |
| CHANGE PATTERN+γ | LIGHTING AREA IS SET TO 50% |
| CHANGE PATTERN−γ | LIGHTING AREA IS DOUBLED (100% AT THE MAXIMUM) |
| CHANGE PATTERN−β | ILLUMINANCE IS INCREASED BY 1 LEVEL |
| CHANGE PATTERN−α | ILLUMINANCE IS INCREASED BY 2 LEVELS, AND LIGHTING AREA IS DOUBLED |

FIG. 6

GREEN POWER DEMAND MANAGEMENT DEVICE

CROSS REFERENCE TO RELATED APPLICATIONS

This application is based upon and claims the benefit of priority from the prior Japanese Patent Application No. 2010-217856, filed on Sep. 28, 2010, the entire contents of which are incorporated herein by reference.

FIELD

Embodiments of the present invention relate to a green power demand management device having high user interface quality in a smart grid.

BACKGROUND

A power company generates power by a plurality of power generating units such as nuclear power plant, natural gas thermal power plant, oil thermal power plant, coal thermal power plant, hydraulic power plant, solar power plant, wind power plant, biomass power plant, geothermal power plant, wave power plant, ocean thermal energy conversion power plant, tidal power plant, and tidal current power plant. The power generated by the above power generating units is classified broadly into two types: green power generated by a method emitting a small amount of carbon dioxide; and non-green power generated by a method emitting a great amount of carbon dioxide. The two types of power is mixed and supplied to customers.

It is expected that customers will be more conscious about the reduction in the amount of carbon dioxide emission, and customers are encouraged to use green power in their energy-consuming appliances. However, the supply of green power is limited, and thus it is difficult to completely satisfy the power demand of customer appliances only with green power.

Further, in the future, demand response will be introduced to control the power consumption of each appliance based on the information of power supplied by a power system. In order to implement this demand response, it is necessary to increase the acceptability of power consumers by carefully controlling the operation mode etc. of each appliance, which is because the acceptability of power consumers may possibly be reduced if the power supplied to each appliance is merely turned ON/OFF.

BRIEF DESCRIPTION OF THE DRAWINGS

FIG. 2 shows an example of a intensity conversion table.

FIG. 3 is a diagram showing an example of a mode change pattern DB.

FIG. 4 is a diagram showing an example of a power consumption variation DB.

FIG. 5 is a diagram showing an example of a forced shift frequency DB.

FIG. 6 is a diagram showing another example of the mode change pattern DB.

DETAILED DESCRIPTION

According to an aspect of embodiments, there is provided a green power demand management device including: a power meter receives power, a receiver, a measuring unit, a setting unit, a power usage history database, a change pattern database, a power consumption variation database, an operating state control manager, an operation information acquiring unit, a forced shift frequency database and the operating state control manager.

The power meter receives power from a power distribution system which generates power with a plurality of power generating units, and supplies a received power to a first appliance.

The receiver receives, from the power distribution system, energy mixture information showing a power generation proportion among each power generating unit.

The measuring unit measures electric energy consumed by the first appliance.

The setting unit sets a first threshold which represents an upper limit of an amount of an environmental load material.

The power usage history database stores the electric energy measured by the measuring unit.

The change pattern database stores a plurality of change patterns each specifying an amount of change in an operational parameter of the first appliance.

The power consumption variation database stores a variation of electric energy consumed per unit time by the first appliance when each change pattern is applied to the first appliance, respectively;

The operating state control manager uses an intensity conversion table including emission intensities each representing an amount of an environmental load material emitted by each power generating unit at generating of unit electric energy, obtains a second threshold by dividing the first threshold by sum total of the emission intensity of each power generating unit weighted by the power generation proportion, and applies, to the first appliance, a change pattern selected from the first database so that electric energy consumption of the first appliance is equal to or smaller than the second threshold.

The operation information acquiring unit acquires operation information showing that the operational parameter of the first appliance has been changed by a user.

The forced shift frequency database stores forced shift frequencies of each change pattern, at which the operational parameter has been changed by the user after each change pattern was applied to the first appliance.

The operating state control manager selects the change pattern based on the forced shift frequencies of each change pattern.

Hereinafter, the embodiments will be explained in detail with reference to drawings.

First Embodiment

Figure 1:
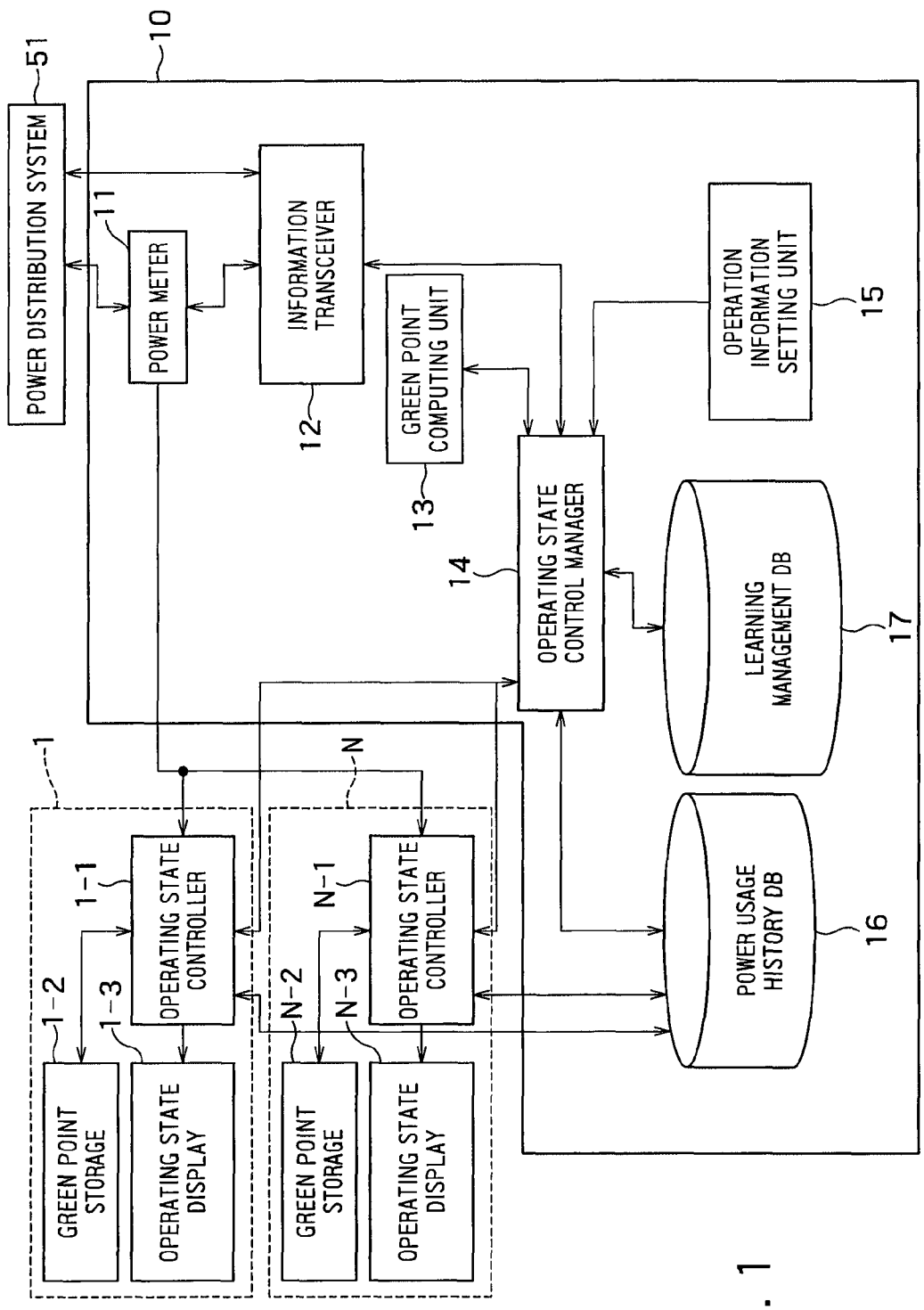
FIG. 1 shows a management system having a green power demand management device according to a first embodiment.

FIG. 1 shows a management system having a green power demand management device 10 according to a first embodiment.

The green power demand management device 10 is arranged in a customer's house, for example. Appliances 1 to N are arranged in the customer's house. The operation of one or more of the appliances 1 to N previously specified by a user are controlled by the green power demand management device 10 depending on the state of power generated by a power distribution system 51. This makes it possible to operate the specified appliance with little environmental load.

The power distribution system 51 has a plurality of power generating units such as nuclear power generating unit, natural gas thermal power generating unit, oil thermal power generating unit, coal thermal power generating unit, hydraulic power generating unit, solar power generating unit, and wind power generating unit. The power distribution system 51 generates power by these power generating units, and supplies the generated power to a power meter 11 in the customer's house.

Further, the power distribution system 51 transmits energy mixture information to an information transceiver (receiver) 12 of the green power demand management device 10. The energy mixture information is information showing the proportion of power generated by each power generating unit. The energy mixture information is updated at constant intervals and transmitted, for example.

When the energy mixture information is updated at 15 minute intervals, the information in a certain time period is shown as follows, for example: "11:45-12:00, coal-fired thermal power: 30%, oil-fired thermal power: 20%, nuclear power: 30%, hydraulic power: 0%." The energy mixture information may include the information of the total generated electric energy.

The power meter (measuring unit) 11 distributes the power supplied from the power distribution system 51 to the appliances 1 to N, and measures the electric energy supplied to each appliance. The power meter 11 transmits the information of the measured electric energy to the information transceiver 12 at constant time intervals.

An information transceiver (receiver) 12 receives the energy mixture information from the power distribution system 51 and the electric energy information from the power meter 11, and transmits the received information to an operating state control manager 14.

The operating state control manager 14 calculates a green point at constant intervals using a green point computing unit 13.

The green point computing unit 13 retains a intensity conversion table therein, and calculates the green point using this table.

FIG. 2 shows an example of the intensity conversion table.

The intensity conversion table expresses the intensity of carbon dioxide emitted by each power generation method. The emission intensity shows the amount of environmental load material emitted when an electric energy of 1 kWh is generated (consumed). In this example, carbon dioxide is shown as an environmental load material, but materials such as NOx and SOx may be treated as environmental load materials.

The green point computing unit 13 calculates the green point of each of the appliances 1 to N by receiving the energy mixture information and electric energy information through the operating state control manager 14.

The green point expresses the electric energy consumed with no (or a small amount of) environmental load (here, $CO_2$) being emitted per unit time. In addition, a non-green point can be computed.

The non-green point expresses the amount of environmental load (here, $CO_2$) emitted per unit time. For example, suppose a case where the intensity conversion table is as shown in FIG. 2 and the energy mixture information is as in the above example showing "11:45-12:00, coal-fired thermal power: 30%, oil-fired thermal power: 20%, nuclear power: 30%, hydraulic power: 0%." In this case, if the electricity consumption of the appliance 1 per unit time is X, the green point can be calculated by the formula of $\{1-(0.858\times0.3)+(0.657\times0.2)+(0.3\times0)+(0\times0)\}\times X$ or by the formula of $\{1-(0.3+0.2)\}\times X$ (the value obtained by subtracting, from 1, the total proportion of power generated with the emission intensity larger than zero (or a predetermined value) is multiplied by X). Further, the non-green point is calculated by the formula of $\{(0.858\times0.3)+(0.657\times0.2)+(0.3\times0)+(0\times0)\}\times X$. Here, the intensity of oil is based on the daytime version (see FIG. 2).

In other words, $CO_2$ having a value of this non-green point is emitted by the power distribution system 51 to generate the electric energy consumed by the appliance 1. The electricity consumption of the appliance 1 can be converted into the $CO_2$ emission having this calculated value.

An operation information setting unit (operation information acquiring unit) 15 receives operation information including user settings of each appliance. For example, the operation information setting unit 15 receives a setting from a customer (power consumer) to "preferentially use green power" in a specific appliance. The "preferential use of green power" means that the operation of the appliance is controlled so that the non-green point becomes a threshold (first threshold) or smaller. This threshold is also specified by the user. When being inputted with the threshold (first threshold) by the user, the operation information setting unit 15 notifies the inputted threshold to the operating state control manager 14. The operating state control manager 14 converts the notified threshold into a threshold (second threshold), of electric energy consumption using the energy mixture information, and stores the threshold (second threshold) in an internal storage or an accessible external storage. Concretely, when the user wants to keep $CO_2$ emission within 1 kg/hour, 1 kg/hour is the first threshold. The second threshold can be obtained by the following formula using the energy mixture information.

$$\text{Second threshold}=1 \text{ kg}/\{(0.858\times0.3)+(0.657\times0.2)+(0.3\times0)+(0\times0)\}=2.572 \text{ kWh}$$

The present embodiment is based on the assumption that the appliance 1 is set to "preferential use of green power." The appliance 1 is defined as an air conditioner. Note that the state where the appliance is operated with an electric energy consumption equal to or smaller than the threshold (second threshold) is referred to as "green operation," and the state where the appliance is operated with an electric energy consumption larger than the threshold (second threshold) is referred to as "non-green operation." Further, the green operation may be expressed by the description that the appliance is operated by "green power."

Further, the operation information setting unit 15 has a function to receive, as the operation information, various settings including a setting of an operational parameter (operation mode) of each appliance. When the appliance is an air conditioner for example, set temperature, air volume, etc. may be used as the operational parameters.

In the present embodiment, the operation information setting unit 15 is arranged in the green power demand management device 10, but the operation information setting unit (operation information acquiring unit) may be arranged in each appliance.

The appliances 1 to N are power-consuming appliances arranged in customer's houses. For example, the power-consuming appliances include air conditioner, lighting appliance, television, refrigerator, washing machine, etc.

The appliances 1 to N have operating state controllers 1-1 to N-1, green point storages 1-2 to N-2, operating state displays 1-3 to N-3, respectively. Each of the operating state displays 1-3 to N-3 is a display device such as a liquid crystal display.

The operating state controllers 1-1 to N-1 control the operation of the appliances 1 to N respectively. The operating state controller of the appliance set to "preferential use of green power" displays on the operating state display whether the current state is green operation state or non-green operation state. Whether or not the green operation is performed is recognized by the notification from the operating state control manager 14.

Further, the operating state controllers 1-1 to N-1 calculate accumulated green points of the appliances 1 to N respectively, and store the accumulated green points in the green point storages 1-2 to N-2 respectively. That is, each operating state controller obtains the accumulated green point by cumulatively adding, to each of the green point storages 1-2 to N-2, the value obtained by multiplying the green point calculated by the green point computing unit 13 and the operating time of each appliance. The accumulated green point can be regarded as the total electric energy consumed without generating any environmental load in the total electric energy consumed by the appliance. The accumulated non-green point may be similarly stored. The accumulated non-green point can be regarded as the amount of environmental load in the total electric energy consumed by the appliance. It is assumed that the accumulated green point and accumulated non-green point are used when recycling the appliance, for example.

A power usage history database (DB) 16 stores the power usage history of each of the appliances 1 to N at constant intervals. The power used by each appliance is notified by the operating state control manager 14 and stored in the power usage history database 16. Alternatively, the operating state controllers 1-1 to N-1 may measure the electric energy used by the appliances 1 to N at constant intervals and write the measured electric energy in the power usage history database 16. In this case, each of the operating state controllers 1-1 to N-1 includes a measuring unit for measuring the electric energy consumed by the appliance.

The operating state control manager 14 controls an operation mode of the appliance 1 so that the appliance 1 performs the green operation, the control being performed using: the threshold (second threshold) of the electric energy consumption computed using the threshold (first threshold) set by the user and the energy mixture information; the power usage history database 16; and a learning management database 17. The operation mode expresses the operating state of the appliance, and the operation mode correspondingly changes when the value of the operational parameter is changed.

The learning management database 17 stores a mode change pattern DB, a power consumption variation DB, and a forced shift frequency DB with respect to each of the appliances 1 to N.

Hereinafter, each DB of the appliance 1 will be exampled.

FIG. 3 shows an example of the mode change pattern DB.

This DB stores change patterns of the operating state of the appliance. The change pattern shows a relative state change. For example, change pattern +α specifies that the target temperature setting of the air conditioner should be changed by +3° C. when cooling, and by −3° C. when heating. Further, change pattern +δ specifies that the air volume should be reduced by 1 level. A combination of a plurality of change patterns in FIG. 3 may be registered as one change pattern. For example, the combination of +α and +δ may be registered as one change pattern. Further, it is also possible to define a change pattern for turning OFF the power source, and a change pattern for turning ON the power source.

FIG. 4 shows an example of the power consumption variation DB.

This DB shows how much power consumption varies (reduces) when the change pattern of FIG. 3 is applied. In the number stored in each DB cell, the positive sign means reduction, and the negative sign means increase.

For example, if the change pattern +α is applied when the air conditioner is operating with a room temperature of 17° C., the power consumption of the air conditioner is reduced by 1.4 kwh.

In this example, the change in the amount of power consumption is defined only depending on room temperature, but the change in the amount of power consumption may be defined depending on the combination of room temperature and humidity.

FIG. 5 shows an example of the forced shift frequency DB. FIG. 5(A) relates to cooling operation, and FIG. 5(B) relates to heating operation.

This DB expresses the frequency with which the operation mode automatically selected by the operating state control manager 14 is forcibly shifted to another operation mode by the user. Here, probability (probability of the shift to forced manual operation) is used to express the frequency, but the number of times may be used instead.

For example, in FIG. 5(A), if the operation mode is changed by being applied with the change pattern +α (see FIG. 3) when the room temperature is 18° C., the probability that the changed operation mode is shifted by the user to another mode is 10%. This value is updated through learning. That is, the DB having uniform initial settings at the time of shipping this device is managed by learning the history on the shift to the forced manual operation during the operation, in view of properties of the power consumer using the appliance and properties of the customer appliance (explained in detail later).

The DB in each of FIG. 4 and FIG. 5 may be set corresponding to each outdoor air temperature. Further, the DB in each of FIG. 4 and FIG. 5 may be set corresponding to each time period (e.g., daytime and nighttime).

FIG. 3 shows, as stated above, an example of the mode change pattern DB for an air conditioner, while FIG. 6 shows an example of the mode change pattern DB for a lighting appliance.

For example, change pattern +α of the lighting appliance specifies that illuminance should be reduced by 2 levels, and lighting area should be set to 50%. As in the case of the air conditioner, the power consumption variation DB and forced shift frequency DB for the lighting appliance are separately arranged in the learning management database 17 (not shown in the drawings).

The green power demand management device 10 of FIG. 1 may have a sensor for measuring the air temperature inside or outside the customer's house.

Figure 7:
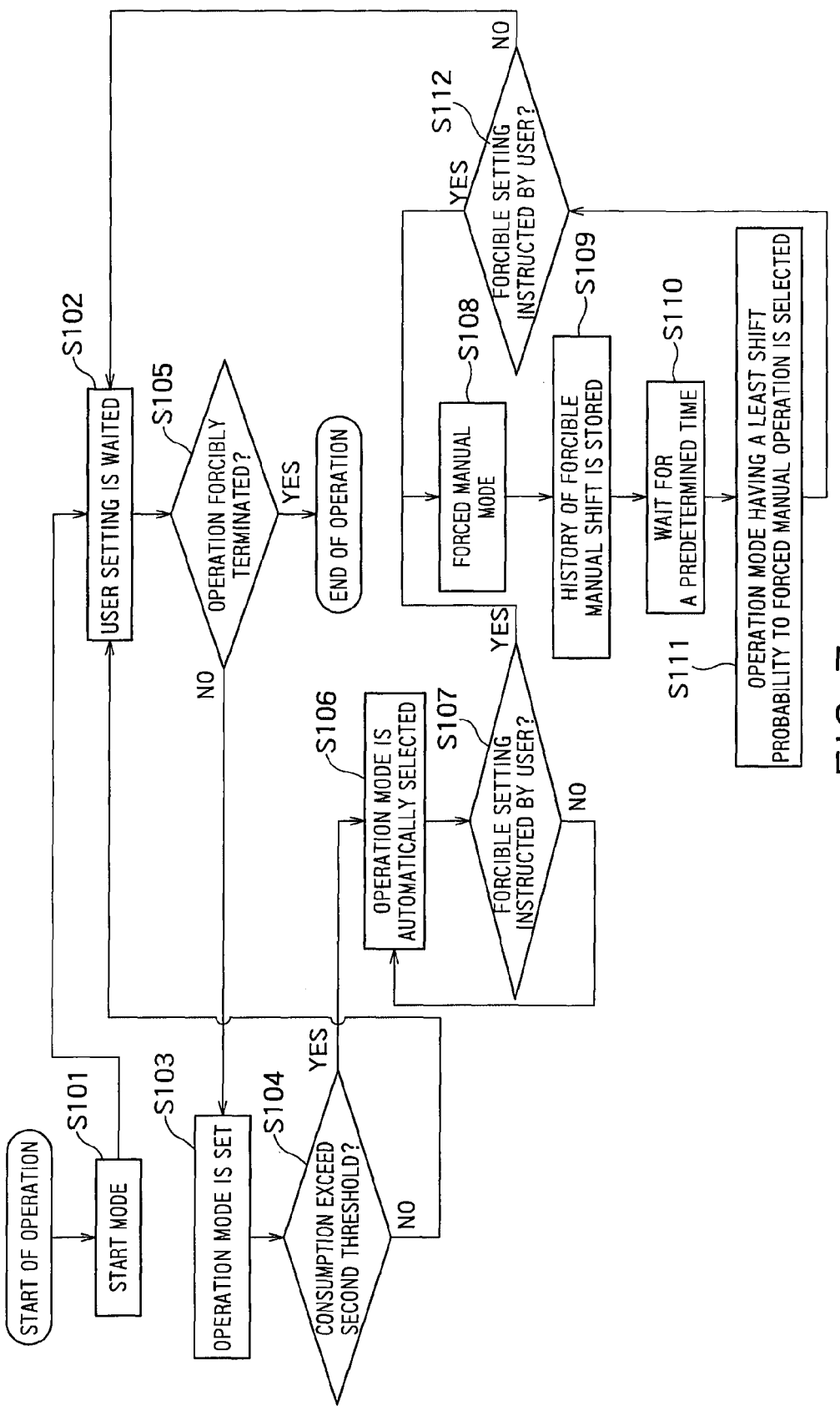
FIG. 7 is a diagram schematically showing an example of the operational flow of an operating state control manager.

FIG. 7 schematically shows an example of the operational flow of the operating state control manager 14. In the following explanation, the operation is performed by the operating state control manager 14, unless otherwise noted.

First, the appliance 1 is started when receiving a command from the customer to start the operation of the appliance 1, through the operation information setting unit 15 (S101). That is, the appliance 1 is shifted to a start mode.

After the appliance 1 is started, a setting input by the user is waited for a certain period of time by monitoring the operation information setting unit 15 (S102). When a forcible operation termination setting is inputted by the customer (YES at S105), the process of this flow is ended. The forcible operation termination setting is turning OFF the power source, for example.

When a setting other than the forcible operation termination setting is inputted, or when no user setting is inputted, the flow proceeds to the step for setting the operation mode (S103).

At step S103, the operation mode is set based on the user setting inputted at step S102 if the user setting is inputted, and is set automatically if no input is obtained at step S102.

As one method of the automatic setting, if the point when the flow proceeds to the step S103 is not immediately after the appliance is started (for example, when this flow is repeated two or more times), the operation mode previously used is continuously used.

On the other hand, when the automatic setting is performed immediately after the appliance is started, the operation mode may be automatically determined based on clock time, the temperature, and humidity when the appliance is started, or may be set to the operation mode used when the power source was previously turned OFF.

Figure 8:
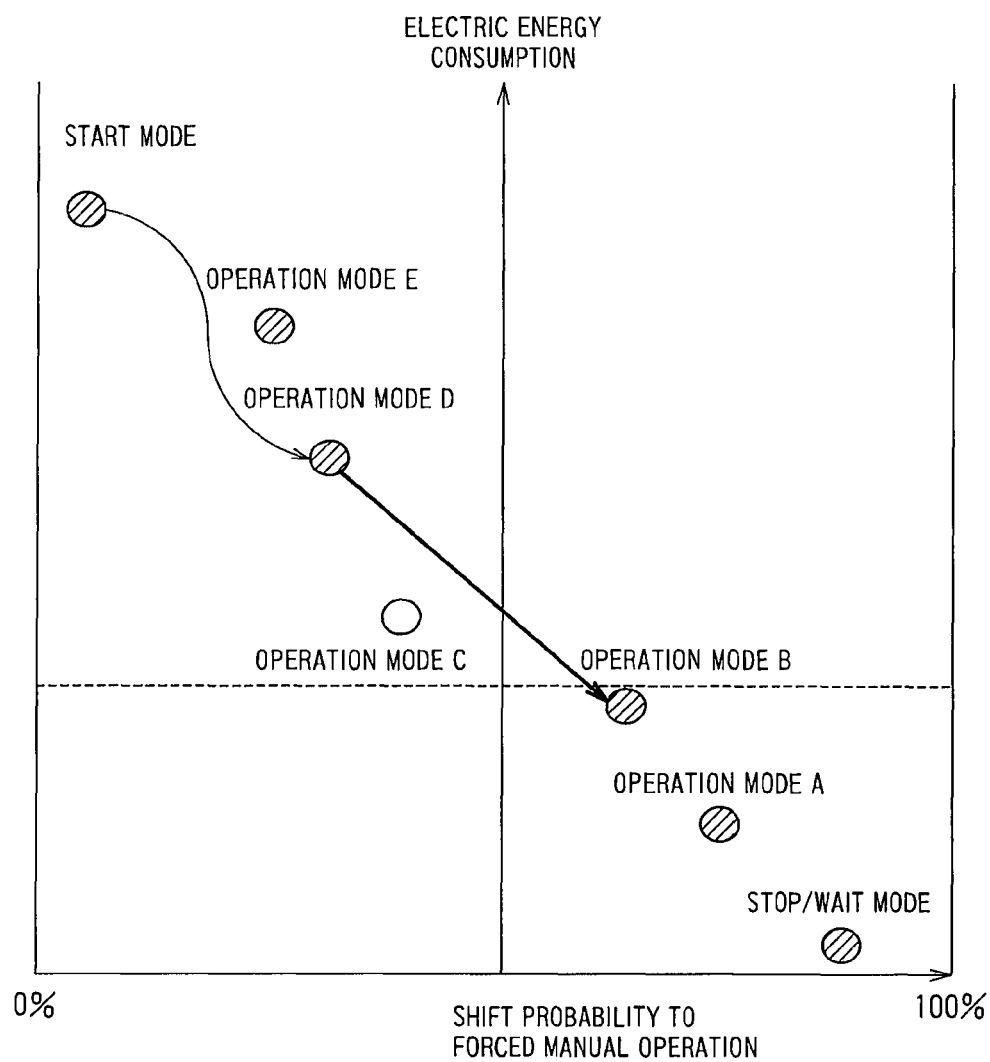
FIG. 8 is a diagram for explaining a method for determining an operation mode in an operation mode autoselection process.

In this example, as shown in the operation mode map of FIG. 8, a certain operation mode (operation mode D) is selected automatically or by the user input immediately after the start. In the operation mode map of FIG. 8, each operation mode represented as a mode point is mapped in a coordinate system in which the horizontal axis represents the probability of the shift to forced manual operation, and the vertical axis represents electric energy consumption. The horizontal dotted line shows the threshold (second threshold).

Operation modes A, B, C, D, and E in the drawing are identified by the parameters such as set temperature and air volume. Each operation mode expresses a different operating state.

Whether the electric energy consumption of the appliance 1 exceeds the threshold (second threshold) while the operation is in this operation mode D, is inspected (S104), and if not, the flow returns to step S102. The steps S102, S105, S103, and S104 are repeated until a forcible operation termination setting is inputted by the user. That is, the process is advanced by letting the operation information setting unit 15 query whether a forcible operation termination setting from the user is inputted or not by performing a polling procedure at predetermined time intervals.

When the electric energy consumption of the appliance 1 exceeds the threshold (second threshold), a process for automatically selecting the operation mode is performed (S106). In this operation mode autoselection process, an operation mode which has a least shift probability to the forced manual operation is selected from the operation modes satisfying the threshold (second threshold).

Here, as shown in FIG. 8, operation mode B is selected. The operation mode B shows the operating state of the appliance 1 after a certain change pattern (see FIG. 3) is applied to the operation mode D. That is, how electric energy consumption change respectively when applying each change pattern of FIG. 3 can be calculated based on the variation of power consumption shown in the power consumption variation DB of FIG. 4. The electric energy consumption when applying each change pattern is calculated using the power consumption variation DB in order to specify the change patterns realizing electric energy consumption which is equal to or smaller than the threshold (second threshold). The change pattern which has the least shift probability in the specified change patterns is selected from the forced shift frequency DB of FIG. 5. Here, the appliance 1 is shifted to the operation mode B after a certain change pattern is selected. The appliance 1 is instructed to operate in the operation mode B.

Here, the electric energy consumption of the appliance 1 may be electric energy consumption in a predetermined past period, or may be predictive consumption amount expected to be consumed in a predetermined future period. The prediction can be performed through linear regression using the past electricity consumption. In this example, electric energy consumed in a predetermined past period is used.

Whether the operating state is forcibly changed by the user (whether forcible setting change is performed) while the operation is in this operation mode B is inspected by monitoring the input into the operation information setting unit 15 (S107).

When the forcible setting change is not instructed by the user, the flow returns to the operation mode autoselection process of the step S106. When the threshold (second threshold) is satisfied in the current operation mode, the flow proceeds to the step S107 again without changing the operation mode. When the threshold (second threshold) is not satisfied, the operation mode is changed by the above method.

When forcible setting change (change of the operational parameter) is instructed by the user at step S107, the operation mode is determined to be shifted to the forcibly set operation mode (forced manual mode), and the appliance 1 is instructed to operate in the forced manual mode (S108). Even when a change is instructed by the user, the flow may proceed to step S102 to treat the change as the setting received at step S102 if the outdoor air temperature is different from that when the operation mode B was selected, or if a predetermined time or longer has passed since the setting at S106 was achieved.

Figure 9:
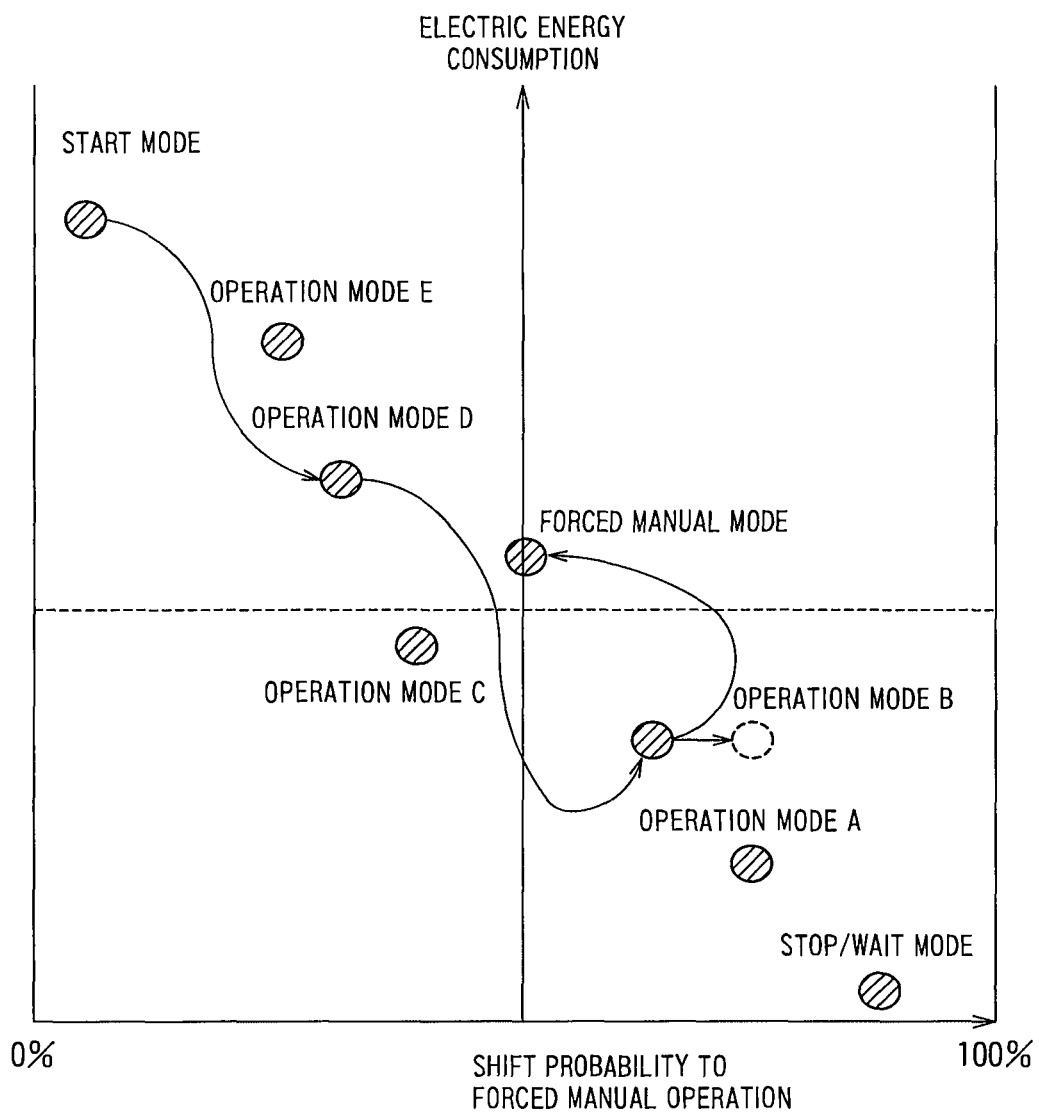
FIG. 9 is a diagram for explaining how to update the probability of the shift to forced manual operation.

At this time, the probability of the shift to the operation mode B is updated in the forced shift frequency DB of FIG. 5 (S109). In other words, the corresponding cell is specified in the forced shift frequency DB based on the change pattern applied when shifting the operation mode from the operation mode D to the operation mode B, and the room temperature (and humidity) referred to when determining the change pattern, and then the value of the corresponding cell is updated. Concretely, to be calculated is a ratio of Sum2 representing the total forcible shift frequency to Sum1 representing the total frequency with which the above change pattern was selected under the above room temperature. For example, a value of 1 is added to each of Sum1 and Sum2 at the previous point and then Sum2/Sum1 is calculated to update the value of the above cell by the calculated value. FIG. 9 shows how the probability of the shift to the operation mode B is updated on the map. When the customer appliance is newly installed, each of Sum1 and Sum2 is initially set to a predetermined value, and the shift probability is also initially set to a predetermined value such as 50%, so that a division by zero is not performed.

The operation is performed in the forced manual mode determined at step S108 for at least a predetermined time (S110).

The operation mode to which the forced manual operation should be shifted is determined based on the electric energy consumption per unit time during the predetermined time (S111).

First, as shown in FIG. 9, the forced manual mode is mapped on the operation mode map. When mapping the forced manual mode, first, a change pattern having a change amount consistent with or closest to the changed operational parameter value specified by the user is specified in the mode change pattern DB of FIG. 3, and then the shift probability is acquired from the specified change pattern and the room temperature at that point based on the shift probability DB of FIG. 5. Then, as shown in the drawing, the position (mode point) on the operation mode map is obtained from the shift probability and the electric energy consumption calculated in this step.

Next, the electric energy consumption and shift probability of each change pattern in FIG. 3 are calculated from the change amount of electric energy consumption based on the current room temperature, and the result is mapped on the operation mode map as an operation mode.

Figure 11:
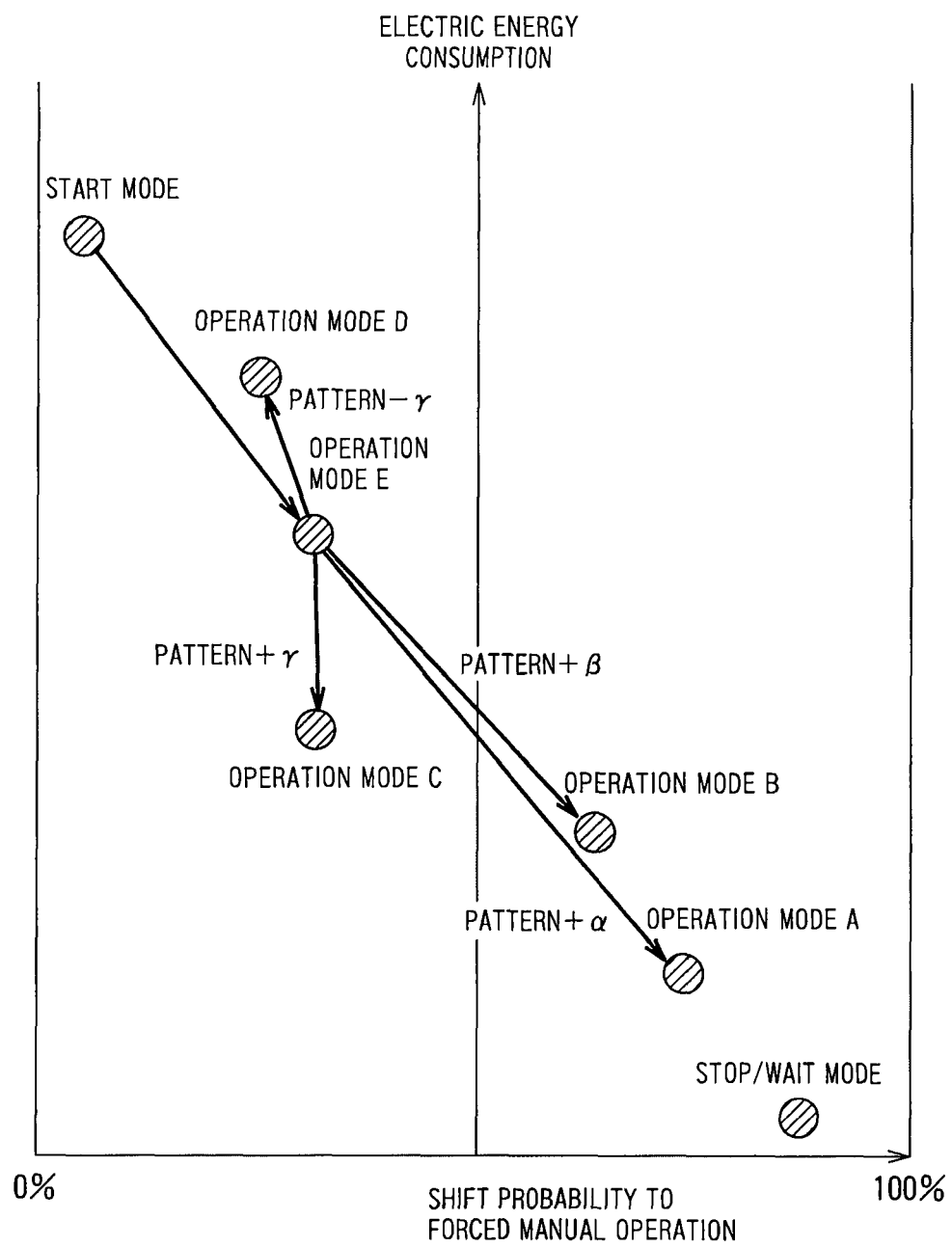
FIG. 11 is a diagram for concretely explaining how the operation mode is shifted by applying the change pattern.

Here, FIG. 11 shows how the operation mode changes by applying the change pattern. Note that the example of FIG. 11 is different from FIG. 8 and FIG. 9 for explanation (the operation modes A to E in FIG. 11 are different from the operation mode A to E in FIG. 8 and FIG. 9). FIG. 11 is based on the assumption that the current operation mode is E. This example shows that the operation mode E applied with the pattern +β is shifted to the operation mode B, and the operation mode E applied with the pattern +α is shifted to the operation mode A, for example.

Figure 10:
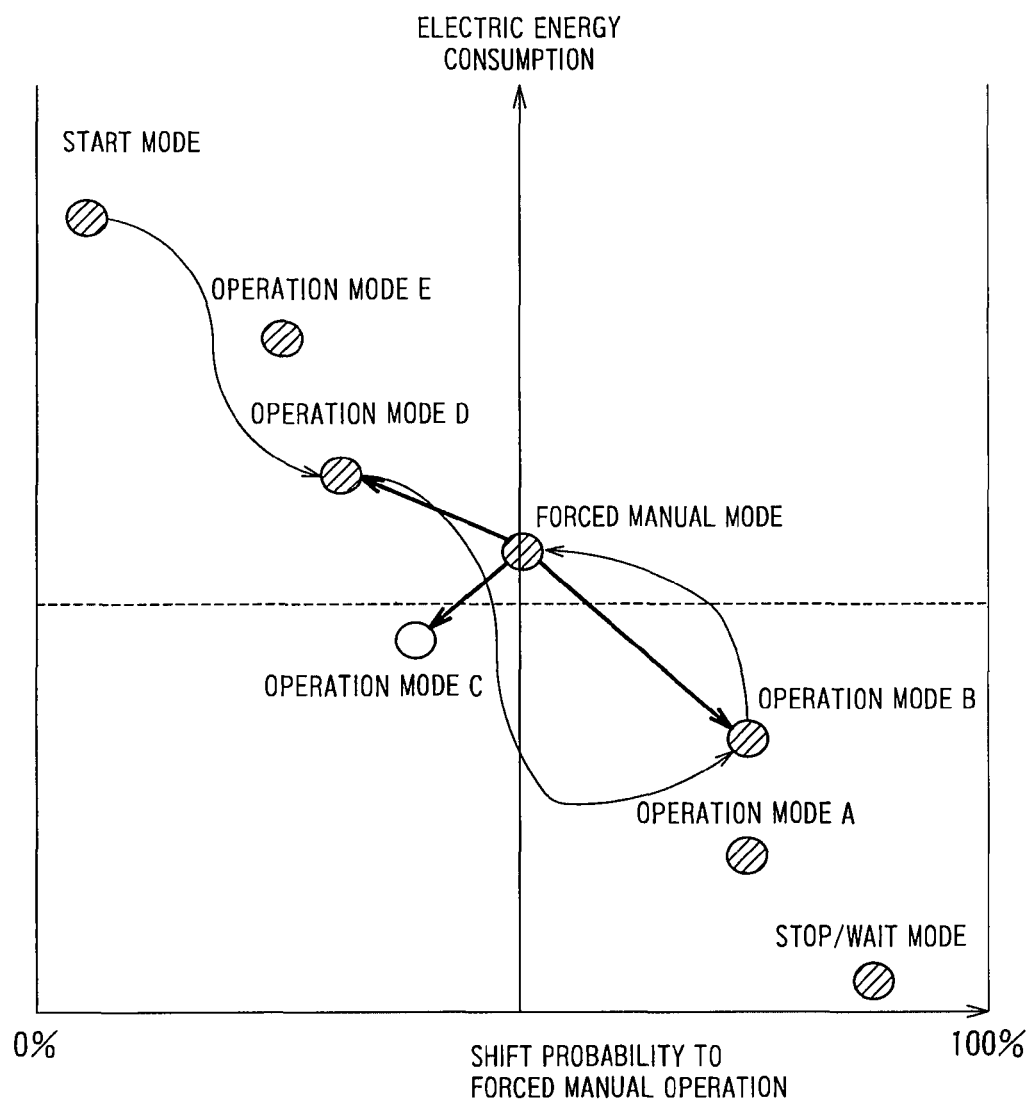
FIG. 10 is a diagram for explaining how the operation mode is shifted to a forced manual mode and how to select the next operation mode.

Similarly to FIG. 11, in FIG. 10, the operation mode when applying each change pattern in FIG. 3 to the current operation mode (forced manual mode) is obtained on the operation mode map.

Next, a predetermined number of operation modes closest (in terms of plane distance) to the current operation mode (forced manual mode) are detected. In the example of FIG. 10, the operation mode D, operation mode C, and operation mode B are detected as being close to the forced manual mode. A mode which realizes electric energy consumption having a threshold (second threshold) or smaller, and which has a least shift probability to the forced manual operation is selected from the detected operation modes and determined as the mode to which the current operation mode should be shifted (S111). In the example of FIG. 10, the operation mode C is selected. The appliance 1 is instructed to carry out the operation mode C.

Whether forcible setting change is performed by the user on the shifted operation mode (here, operation mode C) is inspected (step S112). When no forcible setting change is performed within a predetermined time, the flow returns to step S102. On the other hand, when the user performs forcible setting change within the predetermined time, the operation mode is shifted to the forced manual mode again (S108), and a similar process is repeated thereafter.

In the above flow, after the operation mode is shifted to the forced manual mode at step S108, the operation mode is further unconditionally shifted from the forced manual mode to another operation mode at step S111. However, there is no need to change the operation mode if the electric energy consumption in the forced manual mode is equal to or smaller than the threshold (second threshold).

Figure 12:
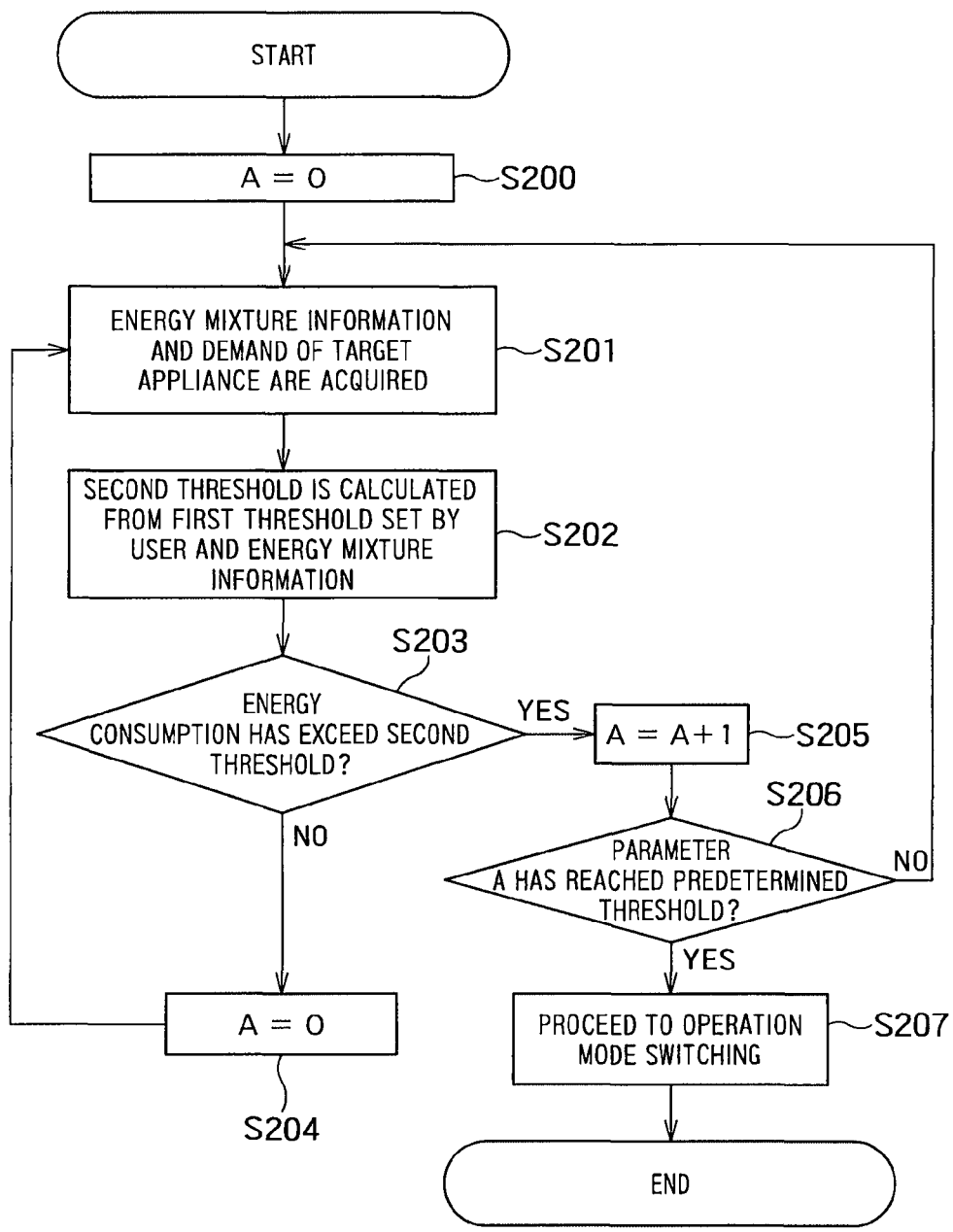
FIG. 12 is a diagram showing the process flow of a modification example of the operation mode autoselection process.

FIG. 12 shows a modification example of the process of step S104 in FIG. 7.

In this example, even when the electric energy consumption exceeds the threshold (second threshold), the flow does not proceed to the operation mode autoselection process as long as the excess continues only for a short period, (S106 in FIG. 7). The flow proceeds to the operation mode autoselection process when the electric energy consumption exceeds the threshold (second threshold) continuously for a long period.

More specifically, first, a parameter A is initialized to 0 (S200). The energy mixture information is acquired at constant time intervals, and the history of the power consumption of each appliance is acquired (S201). Based on the acquired information and history, the threshold (second threshold) of the electric energy consumption is computed (S202).

Whether the electric energy consumption based on the history (past results) exceeds (goes over) the threshold (second threshold) is judged (S203).

When the electric energy consumption does not exceed the threshold (second threshold), the parameter A is initialized to 0 (S204), and the flow returns to step S201. On the other hand, when the electric energy consumption exceeds the threshold (second threshold), 1 is added to the parameter A (A=A+1) (S205).

Whether the parameter A reaches a predetermined value (e.g., 3) is inspected (S206), and if not, the flow returns to step S201. When the parameter A reaches the predetermined value, that is, when the excess sequentially occurs over a plurality of periods, the flow proceeds to the operation mode autoselection process (step S106 at FIG. 7) (S207).

Hereinafter, a concrete example of the process of FIG. 12 will be shown using FIG. 13 and FIG. 14.

Figure 13:
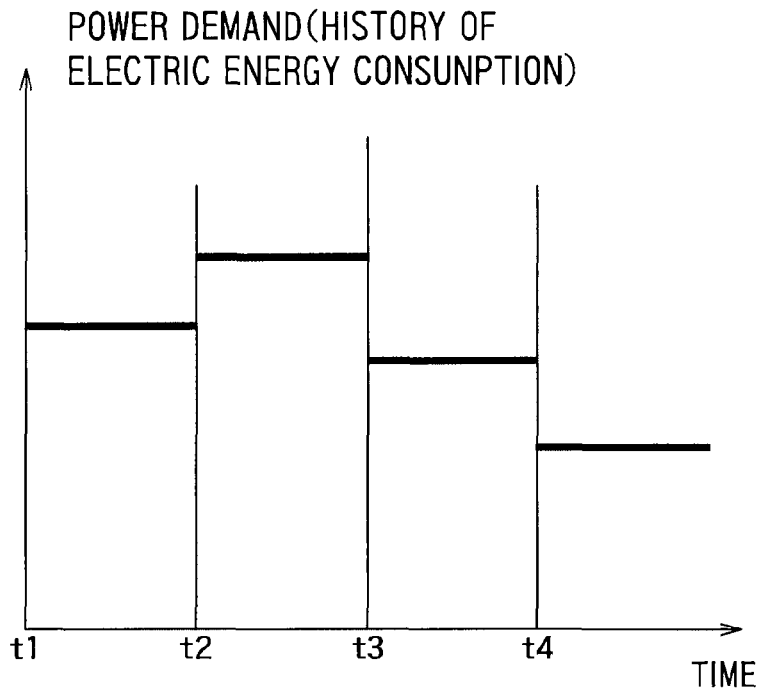
FIG. 13 is a diagram showing a history of variation of electric energy demanded by an appliance.

FIG. 13 shows a history of the variation in the electric energy consumption (actual demand result) of the appliance. The electric energy consumption is measured at predetermined time intervals. The energy mixture information is updated at time t1 and t3.

Figure 14:
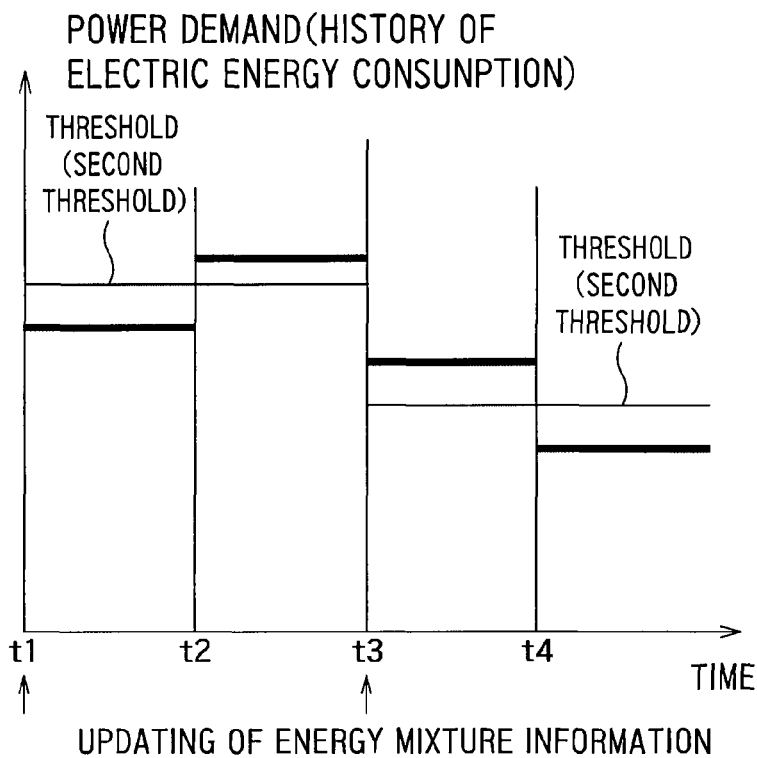
FIG. 14 is a diagram showing a history of variation in a threshold depending on energy mixture information.

FIG. 14 shows an example for calculating the second threshold corresponding to FIG. 13. The green point exceeds the second threshold at time t2 and t3, but becomes smaller than the threshold at time t4. That is, the excess sequentially occurs twice, but the third excess does not occur. Therefore, in this example, it is judged that the excess occurs only for a short period, and the operation mode is not shifted.

In the present embodiment, the electric energy consumption as a history is compared to the threshold (second threshold) when judging whether the operation mode should be shifted (S104 in FIG. 7) and when determining the shift destination operation mode (S106 and S111 in FIG. 7). However, as another method, it is also possible to compare the non-green point of the appliance per unit time with the first threshold. In other words, the amount of environmental load material (carbon dioxide emission) per unit time is obtained as the non-green point using the energy mixture information, and the obtained non-green point is compared to the first threshold. When the obtained non-green point is the first threshold or smaller, the appliance is judged to be in green operation. When the obtained non-green point exceeds the first threshold, the appliance is judged to be in non-green operation.

As stated above, according to the present embodiment, as long as a target appliance is set to "preferential use of green power" by the customer (power consumer), the appliance of each power consumer can be controlled with a small amount of carbon dioxide emission while considering and learning the acceptability of the power consumer.

Further, the electric energy consumption is compared to the threshold (second threshold) over a plurality of periods so that the operation mode is changed when the excess sequentially occurs a plurality of times, which can prevent frequent mode change.

Further, according to the present embodiment, patterns for turning ON and OFF the power source are registered as change patterns, which realizes the control for automatically turning ON the power supply again after the operation is turned OFF.

As stated above, the present embodiment makes it possible to restrain the emission of environmental load materials while controlling the appliance with high acceptability by the customer. Further, controlling of the appliance through a user-friendly interface becomes possible to the power consumer.

Second Embodiment

Figure 18:
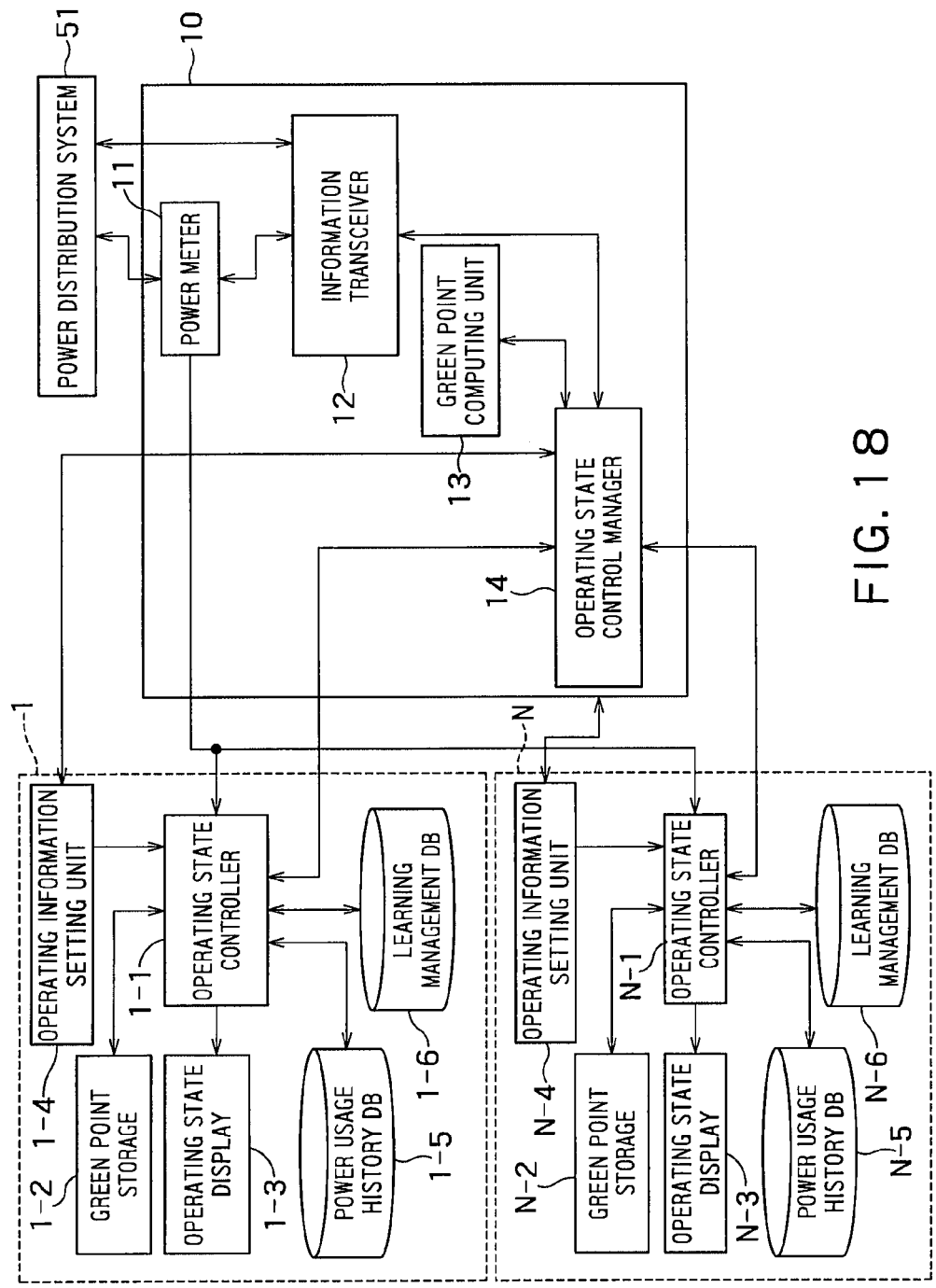
FIG. 18 is a diagram showing a management system having a green power demand management device according to a second embodiment.

In the first embodiment, the operation information setting unit 15 is arranged in the green power demand management device 10, but operation information setting units 1-4 to N-4 (operation information acquiring units) may be separately arranged in respective appliances, as shown in FIG. 18. Further, in this case, power usage history DBs 1-5 to N-5 and learning management DBs 1-6 to N-6 may be separately arranged in respective appliances.

The first threshold of each of the operation information setting units 1-4 to N-4 is set by the user, and the operating state controller 1-1 calculates the second threshold which changes depending on the energy mixture information corresponding to the first threshold, while periodically communicating with the operating state control manager 14. Then, the operation information setting unit controls the operation mode of the appliance 1 so that the electric energy consumption is the second threshold or smaller, instead of the operating state control manager 14 in the above embodiment.

Third Embodiment

In the present embodiment, suppose a case where a customer's power generator (solar power generator in this example) emitting a small amount of carbon dioxide is effectively utilized.

Figure 15:
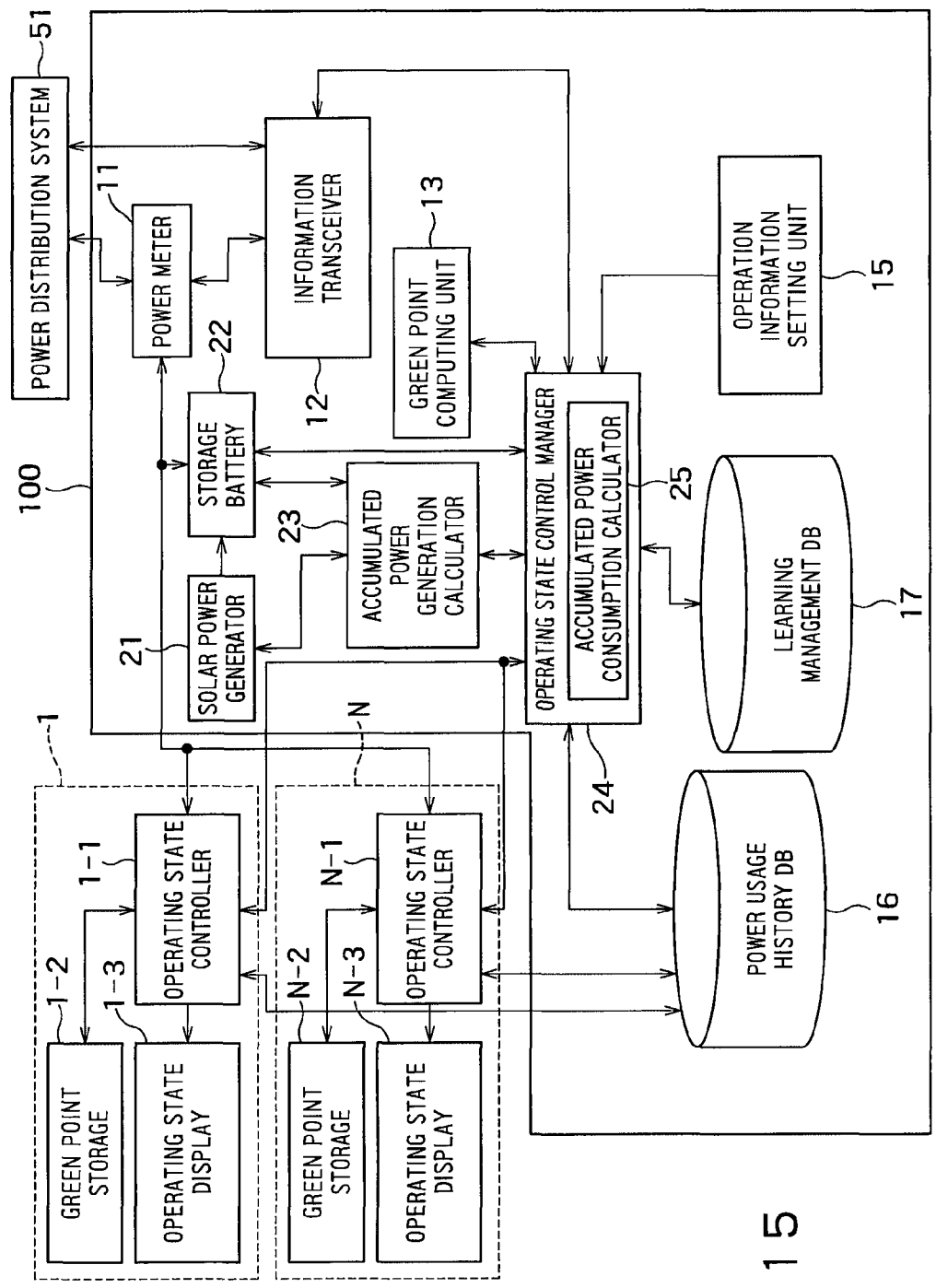
FIG. 15 is a diagram showing a management system having a green power demand management device according to a third embodiment.

FIG. 15 shows a management system having the green power demand management device 100 according to the third embodiment.

This green power demand management device 100 is made by adding a solar power generator 21, a storage battery 22, and an accumulated power generation calculator 23 to the green power demand management device 10 of FIG. 1. Further, an operating state control manager 24 is made by partially expanding the functions of the operating state control manager 14 in FIG. 1, and includes an accumulated power consumption calculator 25, for example.

The solar power generator 21 generates power using solar power. The storage battery 22 is charged with the power generated by the solar power generator 21.

The power generated by the solar power generator 21 can be treated as green power emitting a small amount of carbon dioxide. The power generated by solar power is easily influenced by sunshine conditions and thus unstable. Accordingly, the generated power is once stored in the storage battery 22 of the customer to stabilize the power supply from the source. When the generated power is to be sold, the power may be collected by the power distribution system.

Figure 17:
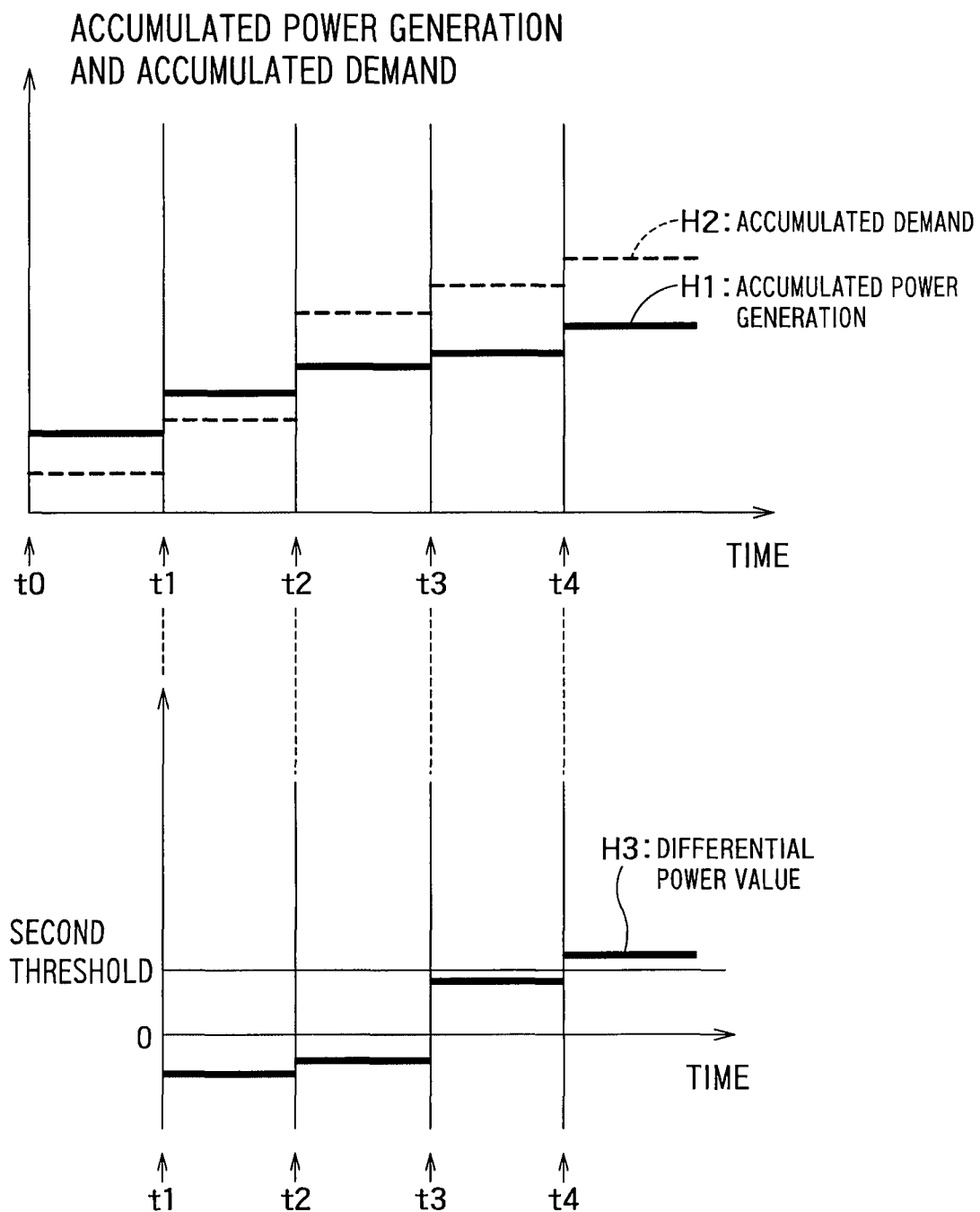
FIG. 17 is a diagram showing the process of how an accumulated power generation value, an accumulated power consumption value, and a green point vary per predetermined unit time.

The accumulated power generation calculator 23 cumulatively calculates the history of the power generation of the solar power generator 21 at predetermined time intervals. The accumulated value is reset once each predetermined period (e.g., each day or each week). The graph H1 of FIG. 17 shows how the accumulated value of the actual power generation result is updated at predetermined time intervals.

The accumulated power consumption calculator 25 calculates the accumulated value of the power consumption (actual demand result) of the target appliance at predetermined time intervals. The graph H2 of FIG. 17 shows how the accumulated value of the power consumption is updated at predetermined time intervals.

The operating state control manager 24 subtracts the accumulated value of the actual power generation result from the accumulated value of the power consumption of the target appliance at predetermined time intervals, and obtains the difference therebetween.

When the differential electric energy is negative, power required by the target appliance can be covered by the generated power, and when the differential electric energy is positive, additional power must be supplied from the power distribution system 51 to operate the target appliance.

The graph H3 of FIG. 17 shows how the differential power value varies at predetermined time intervals. The differential power value between the graphs H1 and H2 in period t1-t0 corresponds to the data of period t2-t1 in the graph H3.

The operational flow of the present embodiment is basically similar to FIG. 7 used in the first embodiment, excepting that electric energy consumption should be replaced by differential power value. In the present embodiment, the differential power value exceeding the threshold (second threshold) is judged as going over the threshold at step S104 in FIG. 7, and the flow proceeds to the operation mode autoselection process (S106). In step S106 and step S111, the operation mode is determined so that the differential power value is the threshold (second threshold) or smaller. The other steps are similar to the first embodiment.

Figure 16:
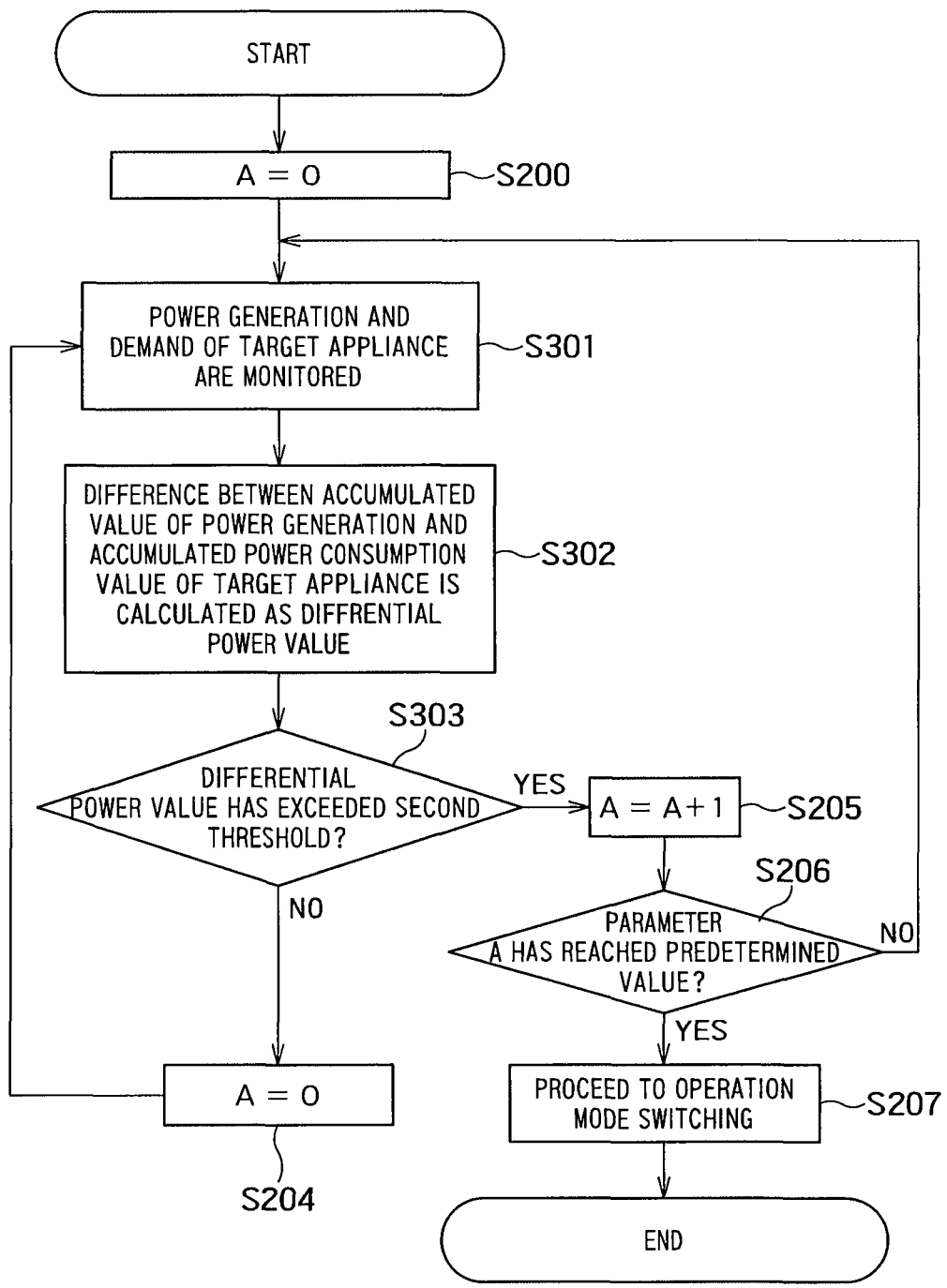
FIG. 16 is a diagram showing the process flow of a modification example of the operation mode autoselection process.

Further, similarly to the first embodiment, judging operation at step S104 may be changed so that the flow does not proceed to the operation mode autoselection process (S106 in FIG. 7) when the excess over the threshold continues for a short period. FIG. 16 shows the operational flow in this case. The steps same as those of FIG. 12 are given the same symbols.

First, the parameter A is initialized to 0 (S200). The energy mixture information is acquired at constant predetermined time intervals, and the history (actual power generation result) and the electric energy consumption (demand) of the target appliance are acquired (S301).

At step S302, the accumulated power consumption value of the target appliance and the accumulated value of the actual power generation result are calculated, and the difference therebetween is calculated.

At step S303, whether the differential power value exceeds (goes over) the threshold is judged.

If not, the parameter A is initialized to 0 (S204), and the flow returns to step S201. On the other hand, if the differential power value goes over the threshold, 1 is added the parameter A (A=A+1) (S205).

Whether the parameter A reaches a predetermined value is inspected (S206), and if not, the flow returns to step S201. When the parameter A reaches the predetermined value, that is, when the excess sequentially occurs over a plurality of times, the flow proceeds to the operation mode autoselection process (step S106 at FIG. 7) (S207).

As stated above, in the present embodiment, the power generated by a power generator held by the customer is used for the appliance set to "preferential use of green power," which effectively increases the options for the operation mode of the appliance.

Note that the green power demand management device of FIGS. 1 and 15 and the home appliance of FIG. 18 can be realized by using a general computer device as basic hardware, for example. That is, each element included in the green power demand management device and the home appliance may be realized by letting a computer carry out a software (computer program) describing instructions of each process. In this case, the green power demand management device and the home appliance can be realized by previously installing the computer program in the computer device or by properly installing, in the computer device, the computer program stored in a non-transitory computer readable medium such as hard disk, memory device, optical disk, etc. or distributed through the network. Further, each storage can be realized by properly using a storage medium such as internal/external memory or hard disk of the above computer device, CD-R, CD-RW, DVD-RAM, DVD-R, etc.

The present invention is not limited to the exact embodiments described above and can be embodied with its components modified in an implementation phase without departing from the scope of the invention. Also, arbitrary combinations of the components disclosed in the above-described embodiments can form various inventions. For example, some of the all components shown in the embodiments may be omitted. Furthermore, components from different embodiments may be combined as appropriate.

The invention claimed is:

1. A green power demand management device comprising:
a power meter configured to receive power from a power distribution system which generates power with a plurality of power generating units, and to supply a received power to a first appliance;
a receiver configured to receive, from the power distribution system, energy mixture information showing a power generation proportion among each power generating unit;
a measuring unit configured to measure electric energy consumed by the first appliance;
a setting unit configured to set a first threshold which represents an upper limit of an amount of an environmental load material;
a power usage history database configured to store the electric energy measured by the measuring unit;
a change pattern database configured to store a plurality of change patterns each specifying an amount of change in an operational parameter of the first appliance;
a power consumption variation database configured to store a variation of electric energy consumed per unit time by the first appliance when each change pattern is applied to the first appliance, respectively;
an operating state control manager configured to use an intensity conversion table including emission intensities each representing an amount of an environmental load material emitted by each power generating unit at generating of unit electric energy, obtain a second threshold by dividing the first threshold by sum total of the emission intensity of each power generating unit weighted by the power generation proportion, and apply, to the first appliance, a change pattern selected from the first database so that electric energy consumption of the first appliance is equal to or smaller than the second threshold;
an operation information acquiring unit configured to acquire operation information showing that the operational parameter of the first appliance has been changed by a user; and
a forced shift frequency database configured to store forced shift frequencies of each change pattern, the forced shift frequencies being frequencies at which the operational parameter has been forcibly changed by the user after each change pattern was applied to the first appliance,
wherein the operating state control manager selects the change pattern based on the forced shift frequencies of each change pattern.

2. The device of claim 1, wherein the operating state control manager selects a change pattern having a lowest forced shift frequency.

3. The device of claim 1,
wherein the operation information includes a value of the operational parameter specified by the user, or includes a change amount from a previously set value of the operational parameter, and
the operating state control manager performs:
specifying a change pattern having a change amount which is closest to the change amount from the previously set value;
setting a first mode point including (a) the electric energy consumption when the first appliance operates with the set operational value and (b) the forced shift frequency corresponding to the specified change pattern;
setting a plurality of mode points each including (a) the electric energy consumption consumed in case that each change pattern is applied to the first appliance and (b) the forced shift frequency corresponding to each change pattern respectively; and
determining a predetermined number of mode points closest in distance to the first mode point among the mode points and selecting a change pattern corresponding to a mode point having a lowest forced shift frequency from among the predetermined number of mode points.

4. The device of claim 1, wherein the operating state control manager compares the electric energy consumption with the second threshold at predetermined time intervals, and makes selecting of the change pattern when the electric energy consumption sequentially exceeds the second threshold a predetermined number of times equal to or more than twice.

5. The device of claim 1, wherein when the value of the operational parameter is changed by the user after the selected change pattern is applied, the operating state control manager updates the forced shift frequency corresponding to the selected change pattern in the forced shift frequency database.

6. A green power demand management device comprising:
a power meter configured to receive power supplied from a power distribution system which generates power with a plurality of power generating units, and to supply a received power to a first appliance;

a receiver configured to receive, from the power distribution system, energy mixture information showing a power generation proportion among each power generating unit;

a measuring unit configured to measure electric energy consumed by the first appliance;

a power usage history database configured to store the electric energy measured by the measuring unit; and a green point computing unit configured to use an intensity conversion table including emission intensities each representing an amount of an environmental load material emitted by each power generating unit when generating unit electric energy, and calculate a green point by multiplying 1 minus a total of power generation proportion by power generating units whose emission intensity are larger than a predetermined value, by the electric energy consumed by the first appliance per unit time, and wherein the first appliance cumulatively stores the green point.

* * * * *